(12) United States Patent
Ouyang

(10) Patent No.: US 10,377,437 B2
(45) Date of Patent: Aug. 13, 2019

(54) INTERNAL STEERING STRUCTURE OF A FRONT WHEEL HUB OF A PORTABLE TWO-WHEELED VEHICLE

(71) Applicant: BEIJING JIAN XING TIAN XIA ENVIRONMENTAL TECHNOLOGY CO., LTD, Beijing (CN)

(72) Inventor: Xianglin Ouyang, Beijing (CN)

(73) Assignee: BEIJING JIAN XING TIAN XIA ENVIRONMENTAL TECHNOLOGY CO., LTD., Beijing (CN)

( * ) Notice: Subject to any disclaimer, the term of this patent is extended or adjusted under 35 U.S.C. 154(b) by 120 days.

(21) Appl. No.: 15/563,572

(22) PCT Filed: Jan. 22, 2016

(86) PCT No.: PCT/CN2016/071716
§ 371 (c)(1),
(2) Date: Sep. 30, 2017

(87) PCT Pub. No.: WO2016/141780
PCT Pub. Date: Sep. 15, 2016

(65) Prior Publication Data
US 2018/0086409 A1  Mar. 29, 2018

(30) Foreign Application Priority Data
Mar. 6, 2015 (CN) .......................... 2015 1 0101084

(51) Int. Cl.
*B62K 19/32* (2006.01)
*B62K 21/00* (2006.01)
(Continued)

(52) U.S. Cl.
CPC .......... *B62K 19/32* (2013.01); *B60B 27/0005* (2013.01); *B60B 27/023* (2013.01);
(Continued)

(58) Field of Classification Search
CPC ...... B62K 21/005; B62K 21/06; B62K 21/12; B62K 21/18
See application file for complete search history.

(56) References Cited

U.S. PATENT DOCUMENTS 5,979,925 A * 11/1999 Lin ........................ B62K 21/18
                                                            280/279
6,322,092 B1 * 11/2001 Chen ...................... B62K 3/002
                                                            280/279
(Continued)

*Primary Examiner* — Joseph M Rocca
*Assistant Examiner* — Marlon A Arce
(74) *Attorney, Agent, or Firm* — CBM Patent Consulting, LLC

(57) ABSTRACT

The present invention discloses an internal steering structure of a front wheel hub of a portable two-wheeled vehicle including a front wheel mounted on a front end of a vehicle body of a two-wheeled vehicle, a handlebars provided at a front end of a vehicle body of a two-wheeled vehicle, and a steering bearing sleeve vertically fixed to the front end of the vehicle body. The steering bearing sleeve is provided with a steering bearing fixing rod which is rotatable within the steering bearing sleeve. The steering bearing fixing rod is fixedly connected to the handlebars and is rotated synchronously with the handlebars. A rotatable front wheel is provided on the steering bearing fixing rod. In the internal steering structure of the front wheel hub of the portable two-wheeled vehicle according to the present invention, the steering bearing sleeve fixed to the front end of the vehicle body and the steering bearing fixing rod rotatable in the steering bearing sleeve are provided and the internal hub and the handlebars are fixedly connected to the steering bearing fixing rod. Which achieves a balanced force, simple structure, easy operation, and which can greatly improve the driving stability.

7 Claims, 2 Drawing Sheets

(51) Int. Cl.
*B62K 21/06* (2006.01)
*B60B 27/00* (2006.01)
*B60B 27/02* (2006.01)
*B62K 19/36* (2006.01)
*B62K 21/12* (2006.01)
*B62K 21/18* (2006.01)

(52) U.S. Cl.
CPC .............. *B62K 19/36* (2013.01); *B62K 21/00* (2013.01); *B62K 21/005* (2013.01); *B62K 21/06* (2013.01); *B62K 21/12* (2013.01); *B62K 21/18* (2013.01)

(56) References Cited

U.S. PATENT DOCUMENTS

| | | | |
|---|---|---|---|
| 6,581,492 B1* | 6/2003 | Chen | B62K 3/002 16/900 |
| 7,954,831 B1* | 6/2011 | Yeh | B62K 3/002 16/429 |
| 8,613,457 B2* | 12/2013 | Wegener | B62K 3/002 280/87.01 |
| 2007/0138758 A1* | 6/2007 | Chao | B62K 15/00 280/279 |
| 2011/0148070 A1* | 6/2011 | Lanz | B62K 19/32 280/279 |
| 2018/0162476 A1* | 6/2018 | Yan | B62K 15/00 |

* cited by examiner

INTERNAL STEERING STRUCTURE OF A FRONT WHEEL HUB OF A PORTABLE TWO-WHEELED VEHICLE

TECHNICAL FIELD

The present invention relates to a steering structure, and more particularly to a front wheel hub steering structure of a portable two-wheeled vehicle.

BACKGROUND ART

In the prior art, the direction control system of the two-wheeled vehicle mainly includes a steering shaft connected to the vehicle body at the front end of the vehicle body and a front fork mounted on the steering shaft. The steering is achieved by controlling the handlebars connected to the fork.

However, in the portable two-wheeled vehicles, such a structure has a lot deficiencies, for example, the volume is too large to meet the two wheeler's portability needs. Or, in order to achieve the portability of the two wheels and the steering system is designed as part of the folding system, but this has brought the problem of instability in the direction of control, and there are driving safety risks.

CONTENTS OF INVENTION

The present invention provides an internal steering structure of a front wheel hub of a portable two-wheeled vehicle in view of the drawbacks of the prior art.

The internal steering structure of the front wheel hub of the portable two-wheeled vehicle according to the present invention includes a front wheel mounted on the front end of the vehicle body of the two-wheeled vehicle, handlebars provided at the front end of the vehicle body of the two-wheeled vehicle, and a steering bearing sleeve vertically fixed to the front end of the vehicle body.

The steering bearing sleeve is provided with a steering bearing fixing rod which is rotatable within the steering bearing sleeve. The steering bearing fixing rod is fixedly connected to the handlebars and is rotated synchronously with the handlebars.

A rotatable front wheel is provided on the steering bearing fixing rod.

In the internal steering structure of the front wheel hub of the portable two-wheeled vehicle according to the present invention, the outer wall of the steering bearing sleeve is provided with at least one fixing member and fixedly connected to the front end of the vehicle body through the fixing member.

The internal steering structure of the front wheel hub of the portable two-wheeled vehicle according to the present invention further includes a steering bearing, and the steering bearing fixing rod is rotatably mounted in the steering bearing sleeve through the steering bearing.

In the internal steering structure of the front wheel hub of the portable two-wheeled vehicle according to the present invention, the front wheel includes a fixed internal hub and an outer wheel rotatable relative to the fixed internal hub.

Wherein the fixed internal hub is annular and the plane which the fixed internal hub is located coincides with the axis of the steering bearing fixing rod.

A fixed mounting seat is provided on the fixed internal hub, and the fixed internal hub is fixedly mounted on the steering bearing fixing rod through the fixed mounting seat. Said handlebars are mounted on said fixed mount.

In the internal steering structure of the front wheel hub of the portable two-wheeled vehicle according to the present invention, the outer wheel includes an outer hub and a tire provided on the outer hub.

The internal steering structure further comprises a rotary connecting device, and the outer hub is rotatably fitted to the outer ring of the fixed internal hub by the rotation coupling device.

In the internal steering structure of the front wheel hub of the portable two-wheeled vehicle according to the present invention, the rotary connection device includes a ball holder provided between the outer hub and the fixed internal hub, a plurality of halls are provided in the ball holder, and the balls are in rolling contact with the outer hub and the fixed hub, respectively.

In the internal steering structure of the front wheel hub of the portable two-wheeled vehicle according to the present invention, the middle of the fixed mounting seat is provided with a mounting hole, and the fixed hub is perforated through the mounting hole through bolts, so as to be fixedly mounted on said steering bearing fixing rod.

The fixed mounting seat is provided with a mounting fixing hole at both ends thereof respectively, the ends of the handlebars have a left branch and a right branch, and the left and right branches are respectively mounted to a mounting fixing hole at both ends of the fixed mount by a fixing bolt.

A space for rotation of the outer wheel is formed between the left branch and the right branch.

The internal steering structure of the front wheel hub of the portable two-wheeled vehicle according to the present invention further comprises a steering bearing ring which is connected to the end of the steering bearing sleeve and is resistant to the steering bearing.

In the internal steering structure of the front wheel huh of the portable two-wheeled vehicle according to the present invention, by providing a steering bearing sleeve fixed to the front end of the vehicle body and a steering bearing fixing rod rotatable in the steering hearing sleeve, and the inner hub and the handlebars are fixedly connected with the steering bearing fixing rod, the steering force balance is realized, the structure is simple and the operation is convenient, and the driving stability can be greatly improved.

SPECIFIC MODE FOR CARRYING OUT THE INVENTION

The present invention will now be described in further detail with reference to the accompanying drawings in order to enable those skilled in the art to practice with reference to the teachings.

Figure 1:
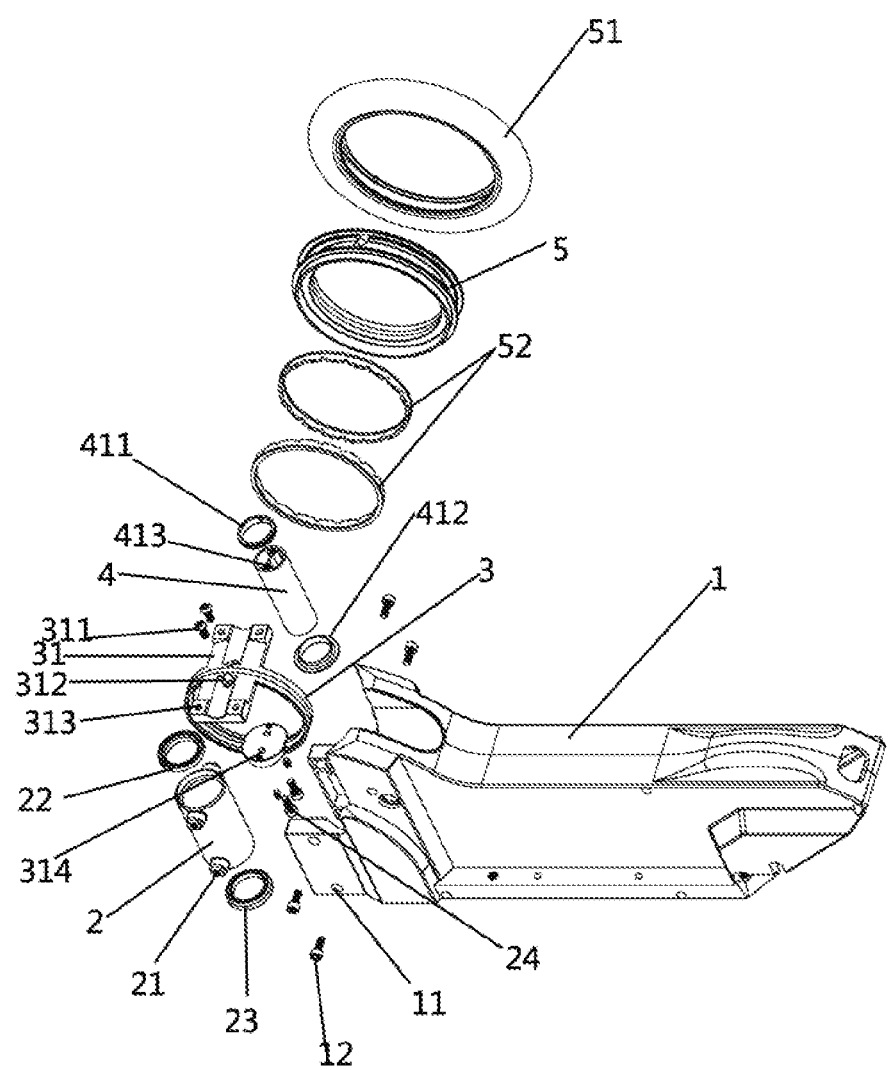
FIG. 1 is an exploded view of an internal steering structure of a front wheel hub of a portable two-wheeled vehicle according to the present invention.
Figure 2:
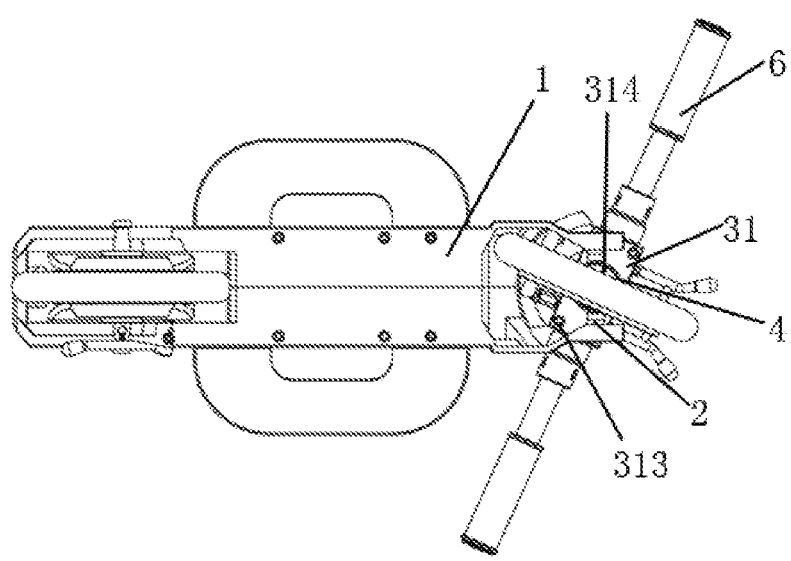
FIG. 2 is a bottom view of the internal steering structure of the front wheel hub of the portable two-wheeled vehicle according to the present invention.

As shown in FIGS. 1 and 2, the internal steering structure of the front wheel hub of the portable two-wheeled vehicle according to the present invention is applicable to a two-wheeled vehicle having a small wheel type structure. The two-wheeled vehicle includes a front wheel mounted on the front end of the vehicle body 1 of a two-wheeled vehicle, handlebars 6 provided at the front end of the vehicle body 1 of the two-wheeled vehicle, and a steering bearing sleeve 2 vertically fixed to the front end of the vehicle body 1. In the present invention, at least one fixing member may be provided on the outer wall of the steering bearing bushing 2 and fixedly connected to the front end of the vehicle body 1 through the fixing member. In the present embodiment, four through-holes 11 are formed at the front end of the vehicle body 1, and the four through-holes 11 are equally divided on each side of the front end of the vehicle body 1. Correspondingly, the mounting screw hole 21 is provided in the outer wall of the steering bearing bushing 2, and the bolt 12 is inserted through the through hole 11 and screwed into the mounting screw hole 21, so that the steering bearing bushing 2 is fixedly mounted on the front end of the vehicle body 1.

In the present invention, the steering bearing sleeve 2 is provided with a steering bearing fixing rod 4 which is rotatable within the steering bearing sleeve 2. The steering bearing fixing rod 4 is fixedly connected to the handlebars and is rotated synchronously with the handlebars. In order to ensure a more smooth rotation of the steering bearing fixing rod 4, in the present invention, a steering bearing (The steering bearing may specifically include a steering bearing 22 and a steering bearing 23 provided at the lead-end and rear-end of the steering bearing fixing rod 4, respectively). The steering bearing fixing rod 4 is rotatably mounted in the steering bearing sleeve 2 through the steering bearing (i.e., the steering bearing 22, and the steering bearing 23). Further, the steering bearing press ring may be provided and the steering bearing press ring is attached to the end of the steering bearing sleeve to withstand the steering bearing. Specifically, in the present embodiment, two steering bearing presses 411, 412 are provided. The steering bearing press ring 411 and the steering bearing presser 412 are located at both ends of the steering bearing sleeve 2 and are respectively engaged with both ends of the steering bearing sleeve 2. When the steering bearing presser 411 and the steering bearing presser 412 are engaged with the steering bearing bushings 2, their sides toward the inside of the steering sleeve 2 are against the steering bearing 22 and the diverter bearing 23, respectively.

In the present invention, a rotatable front wheel is provided on the steering bearing fixing rod 4. Specifically, as shown in FIG. 1, the front wheel includes a fixed inner hub 3 and an outer wheel rotatable relative to the fixed inner hub 3. Wherein the fixed internal hub 3 is annular. The plane which the fixed internal hub 3 is located coincides with the axis of the steering bearing fixing rod 4. That is, the steering bearing fixing rod 4 is located in an annular region of the fixed internal hub 3 in parallel with the fixed internal hub 3. A fixed mounting seat 31 is provided on the fixed internal hub 3. The fixed internal hub 3 is fixed to the steering bearing fixing rod 4 through the fixed mounting seat 31. Said handlebars are mounted on said fixed mount 3.

In the present invention, the outer ring may specifically include an outer hub 5 and a tire 51 provided on the outer hub 5. A rotary connecting device is further comprised, and the outer hub 5 is rotatably fitted to the outer ring of the fixed internal hub 3 by the rotation coupling device. In the present embodiment, the rotary connecting device specifically includes a roller frame 52 provided between the outer hub 5 and the fixed internal hub 3. A plurality of balls (not shown in drawings) are provided in the ball holder 52, and the balls are in rolling contact with the outer hub 5 and the fixed internal hub 3, respectively. By the roller and the ball holder 52, the outer hub 5 is rotatable about the fixing hub 3 which is fixed.

In the present invention, the middle portion of the fixed mounting seat 31 is provided with a mounting hole 312, and the fixed internal hub 3 is inserted through the mounting hole 312 via a bolt 311, so as to be fixedly mounted on the screw hole 413 of the steering bearing fixing rod 4. For the sake of stability, another mounting seat 314 may be provided on the opposite side of the fixed mounting seat 31 and connected to the other end of the steering bearing fixing rod 4 with the bolt 24 penetrating the mounting seat 314.

Amounting fixing holes 313 is provided at both ends of the fixed mounting seat 31, respectively. The ends of the handlebars 6 have a left branch and a right branch (not shown), and the left and right branches are attached to the mounting fixing holes 313 at both ends of the fixing mount 31 by fixing bolts, respectively. A space for rotation of the outer wheel is formed between the left branch and the right branch, whereby the fixed internal hub 3 is fixed and the outer wheel is freely rotatable about the fixed internal hub 3.

While the embodiments of the present invention have been disclosed above, it is not limited to the use in the specification and the embodiments, it is entirely applicable to a variety of fields suitable for the present invention and is readily available to those skilled in the art The present invention is not limited to the specific details and the illustrations shown herein and described herein without departing from the general concept as defined by the claims and the scope of equivalents.

What is claimed is:

1. An internal steering structure of a front wheel hub of a portable two-wheeled vehicle, comprising:
   a front wheel mounted on a front end of a vehicle body of the two-wheeled vehicle; and
   handlebars provided at a front end of a vehicle body of a two-wheeled vehicle;
   characterized by further including a steering bearing sleeve that is vertically fixed to the front end of the vehicle body;
   wherein the steering bearing sleeve is provided with a steering bearing fixing rod which is rotatable within the steering bearing sleeve; wherein the steering bearing fixing rod is fixedly connected to the handlebars and is rotated synchronously with the handlebars; wherein the front wheel is provided on the steering bearing fixing rod;
   said front wheel includes a fixed internal hub and an outer wheel rotatable relative to said fixed internal hub;
   wherein the fixed internal hub is annular and the plane which the fixed internal hub is located coincides with the axis of the steering bearing fixing rod;
   wherein a fixed mounting seat is provided on the fixed internal hub, and the fixed internal hub is fixedly mounted on the steering bearing fixing rod through the fixed mounting seat, and said handlebars are mounted on fixed internal hub.

2. The internal steering structure of the front wheel hub of a portable two-wheeled vehicle according to claim 1, wherein outer wall of the steering bearing sleeve is provided with at least one fixing member, and the steering bearing sleeve is fixedly connected to the front end of the vehicle body through the fixing member.

3. The internal steering structure of the front wheel hub of a portable two-wheeled vehicle according to claim 1, further comprising the steering bearing, and a steering bearing fixing rod is rotatably mounted in the steering bearing sleeve through the steering bearing.

4. The internal steering structure of the front wheel hub of a portable two-wheeled vehicle according to claim 1, wherein said outer wheel includes an outer hub and a tire disposed on said outer hub, and further including a rotary connecting device;
  wherein the outer hub is rotatably fitted to the outer ring of the fixed internal hub by the rotation coupling device.

5. The internal steering structure of the front wheel hub of a portable two-wheeled vehicle according to claim 1,
  wherein said rotary connecting device comprises:
    a ball holder provided between the outer hub and the fixed internal hub,
    a plurality of balls are provided in the frame, and the balls are in rolling contact with the outer hub and the fixed hub, respectively.

6. The internal steering structure of the front wheel hub of a portable two-wheeled vehicle according to claim 4, wherein a mounting hole is provided in a middle portion of the fixed mounting seat, and said fixed internal hub is perforated through said mounting hole via bolts, so that said fixed hub is fixedly mounted on said steering bearing fixing rod;
  wherein the fixed mounting seat is provided with a mounting fixing hole at both ends thereof respectively, the ends of the handlebars have a left branch and a right branch, and the left and right branches are respectively mounted to a mounting fixing hole at both ends of the fixed internal mount by a fixing bolt;
  wherein a space for rotation of the outer wheel is formed between the left branch and the right branch.

7. The internal steering structure of the front wheel hub of a portable two-wheeled vehicle according to claim 3, further comprising a steering bearing ring which is connected to the end of said steering bearing sleeve and is against the steering bearing.

* * * * *